(12) United States Patent
Belanger

(10) Patent No.: US 7,681,274 B2
(45) Date of Patent: Mar. 23, 2010

(54) OVERHEAD BRUSH SUPPORT AND COUNTERWEIGHT

(75) Inventor: Michael J. Belanger, Novi, MI (US)

(73) Assignee: Belanger, Inc., Northville, MI (US)

( * ) Notice: Subject to any disclaimer, the term of this patent is extended or adjusted under 35 U.S.C. 154(b) by 1049 days.

(21) Appl. No.: 11/371,474

(22) Filed: Mar. 9, 2006

(65) Prior Publication Data

US 2007/0209128 A1    Sep. 13, 2007

(51) Int. Cl.
*B60S 3/06* (2006.01)
(52) U.S. Cl. .......................... 15/53.2; 15/53.1; 15/53.3; 15/DIG. 2
(58) Field of Classification Search ............... 15/53.2, 15/53.3, DIG. 2, 53.1
See application file for complete search history.

(56) References Cited

U.S. PATENT DOCUMENTS

| 3,035,293 | A | 5/1962 | Larson | 15/21 |
|---|---|---|---|---|
| 3,798,696 | A | 3/1974 | Cirino | 15/21 E |
| 5,713,092 | A | 2/1998 | Belanger et al. | 15/53.2 |
| 5,722,104 | A | 3/1998 | Wentworth | 15/53.2 |

*Primary Examiner*—Shay L Karls
(74) *Attorney, Agent, or Firm*—Young Basile

(57) ABSTRACT

A horizontal car wash implement for a vehicle laundering or finishing plant wherein a horizontal implement rotated by a hydraulic motor is mounted between the free ends of pivot arms carried by spaced vertical support columns on opposing sides of a vehicle wash lane. The car wash implement is mounted between the ends of a pair of spaced apart, parallel support arms and a counterweight is mounted to the ends of a second pair of spaced support arms. The counterweight support arms and the car wash implement support arms are adapted to pivotally mount to the vertical support columns. The counterweight support arms and the implement support arms are mechanically interconnected such that the support arms of the car wash implement and the counterweight pivotally move synchronously in opposing directions relative to one another on one side of the vertical support columns.

9 Claims, 4 Drawing Sheets

US 7,681,274 B2

OVERHEAD BRUSH SUPPORT AND COUNTERWEIGHT

FIELD OF THE INVENTION

The subject invention relates to a car wash apparatus having a counterweight arrangement for a horizontal car wash implement such as a brush wherein the counterweight support arms and the car wash implement support arms are separate components that are mechanically interconnected to move in synchronism. More particularly, the invention relates to a horizontal car wash implement and counterweight arrangement wherein the counterweight support arms and the car wash implement support arms lie on the same side of the vertical support columns.

BACKGROUND

Counterweighted top brushes for carwash brushes and other implements are well-known in the prior art. In general, a typical top brush installation includes vertical support columns on opposing sides of a wash lane. The vertical columns provide pivot points for a pair of pivot arms. A brush is mounted between the arms at one end and a counterweight is mounted at the opposite end. Because both arms are one-piece structures, synchronized movement on the brush and the counterweight in opposite directions is inherent. This arrangement, however, can be problematic in car wash systems having limited availability of space.

U.S. Pat. No. 5,713,092, "Counterweighted Vehicle Laundry Top Brush and Position Control System", issued Feb. 3, 1998 shows a space-saving brush and counterweight arrangement wherein the top brush and the counterweights are carried by separate support arms and both sets of arms are on the same side of the pivot axis. The arms are mechanically connected by gears so that they move in opposite directions and in synchromism. Two separate counterweights are used, one on each arm and the brush support arms are slotted to permit the counterweights to pass through them on each side such that the counterweights cross below the brush.

SUMMARY OF THE INVENTION

The present invention is a counterweighted pivotal arm support system for a horizontal car wash implement such as a brush or spray bar arranged so that the implement is countered by a single counterweight positioned on the same side of the vertical support columns as the implement. In an illustrative embodiment of the invention, the car wash implement is supported by a first pair of support arms. The first support arms are parallel to one another and spaced across the wash lane from one another. The implement is mounted between the free ends of the support arms. The opposing ends of the implement support arms are configured to be pivotally mounted to the vertical support columns. A second pair of parallel support arms is similarly mounted to the vertical columns. A counterweight is mounted between the free ends of the second pair of support arms. The opposing ends of the counterweight support arms are configured to be pivotally mounted to the vertical support columns.

The counterweight support arms and the wash implement support arms are mechanically interconnected so as to move in opposite directions and in synchromism. The mechanical interconnection means permits the pair of wash implement support arms to pivot synchronously with the counterweight support arms in opposing directions relative to one another, wherein, for example, movement of the brush support arms in the downward direction produces a corresponding synchronous movement of the counterweight arms in the upward direction.

In the following description, the implement described is a top brush; i.e., a brush having a longitudinal axis of rotation. However, the implement could be a spray bar or a blower support bar. Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
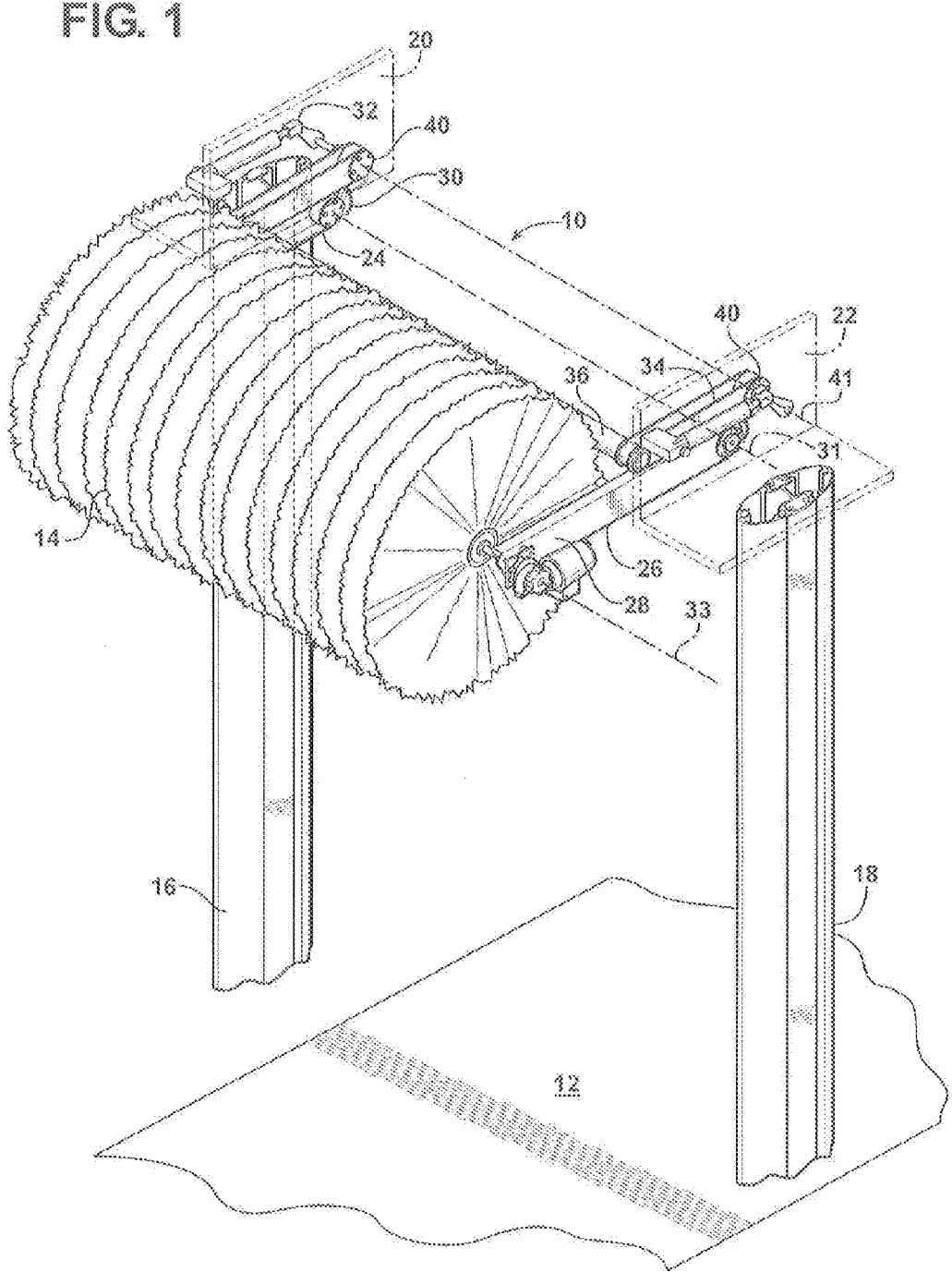
FIG. 1 is a perspective view of the vehicle top brush and counterweight apparatus in accordance with the present invention in which the top brush is in a raised position.

FIGS. 1-4 illustrate a counterweight pivotal support system 10 for a horizontal car wash implement in a vehicle laundry system having a wash lane 12 for travel of the vehicle through the vehicle laundry system in the direction indicated by the arrow. The implement is, as shown by example in FIGS. 1-4, a car wash brush 14. The system shown in FIGS. 1-4 is typically used in conjunction with other vehicle laundry system components including spray arches, side brushes, window brushes, wheel cleaners, rinse spray arches, dryer blowers, and the like. The system of FIGS. 1-4 can be employed in new vehicle laundry systems or can be retrofitted in existing vehicle laundry systems.

The vehicle laundry system illustrated in FIGS. 1-4 comprises a pair of vertical support columns 16, 18 disposed on opposing sides of a vehicle wash lane 12. The spacing between the two vertical support columns 16, 18 permits the passage of a vehicle and provides clearance for the components of the system. The vertical columns 16, 18 are bolted to the floor and are of such size and strength as to be capable of bearing substantial compression and bending loads as will be apparent to those skilled in the relevant mechanical arts from the following description.

In the preferred embodiment, the upper ends of the vertical support columns are provided with vertical support plates 20, 22. The planes of the plates 20, 22 are parallel to one another and to the direction of the vehicle travel. The plates 20, 22 serve as the support for pair of wash brush support arms 24, 26. Each wash brush support arm 24, 26 includes a free end 28 and a mounting end 30 that is adapted for pivotal mounting. The wash brush support arms 24, 26 are spaced apart and parallel to one another. One wash brush support arm 24 is pivotally mounted to one plate 20 and the opposing wash brush support arm 26 is pivotally mounted to the opposing plate 22. The brush support arms pivotally mounted to the vertical plates defines a first pivotal axis 31. The wash brush 14 is rotatably mounted between the free ends 28 of the support arms 24, 26 and defines an axis of rotation 33. The brush 14 is powered in rotation by motor/gear box assembly 35. The axis of rotation 33 is parallel to the first pivot axis 31. The plates 20, 22 also serve as the support for a second pair of support arms 32, 34 for supporting an elongated counterweight 36. Each counterweight support arm 32, 34 also includes a free end 38 and a mounting end 40 that is adapted for pivotal mounting. The counterweight support arms 32, 34 are spaced apart and parallel to one another. One counterweight support arm 32 is pivotally mounted to one plate 20 and the opposing counterweight support arm 34 is pivotally mounted to the opposing plate 20. The counterweight support arms 32, 34 pivotally mounted to the vertical plates 20, 22 defines a second pivot axis 41. The second pivot axis 41 is parallel to the first pivot axis 31. The counterweight 36 is mounted between the free ends 38 of the support arms 32, 34 and extends across the vehicle wash lane 12. All four support arms 24, 26, 32, and 34 extend into the wash lane 12 on one side of the parallel vertical support columns 16, 18.

In the preferred embodiment, the wash brush support arms and the counterweight arms are interconnected by gears 42. A gear 42 is attached to each support arm 24, 26, 32, and 34. The gears 42 are sectorial in shape and have meshing teeth along the outer sectorial surface. The teeth of the gear 42 attached to one of the counterweight support arms 34 and the teeth of the gear 42 attached to the brush support arm 26, both of which are mounted to plate 22, are engaged together. The gear 42 configuration permits the pair of wash brush support arms 24, 26 to pivot synchronously with the counterweight support arms 32, 34 in opposing directions relative to one another. For example, movement of the brush support arms 24, 26 in the downward direction produces a corresponding synchronous movement of the counterweight arms 32, 34 in the upward direction. While sector gears are used in the preferred embodiment to create the desired movement between the two pairs of arms, other mechanical means such as a chain and sprocket configuration and a pulley can be used to create equivalent structures. An air cylinder 37 raises the brush 14 on command.

Figure 2:
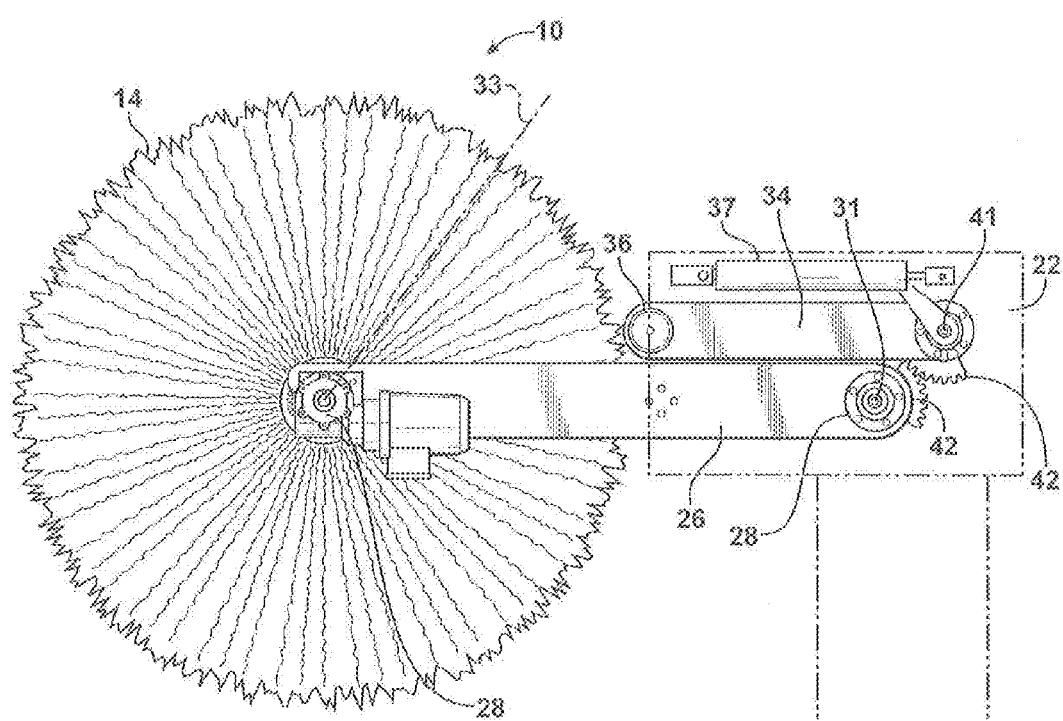
FIG. 2 is a side view of the apparatus of FIG. 1 with the top brush in a raised position and the counterweight in a lowered position.

In FIGS. 1 and 2 the brush support arms 24, 26 are in a fully raised position and the counterweight 36 is in a fully lowered position. The counterweight 36 does not pass through the brush arm support 24, 26 or cross below the wash brush 14. In this position, the counterweight support arms 32, 34 are folded over the brush support arms 24, 26. The counterweight support arms 32, 34 are essentially parallel to the brush support arms 24, 26. The angle formed between the brush support arms 24, 26 and the counterweight support arms 32, 34 is approximately zero. The lengths of the counterweight support arms 32, 34 are slightly shorter than the support arms 24, 26 of the wash brush 14. The shorter length of the counterweight support arms 32, 34 prevents the counterweight 36 from passing into the swept volume of the brush 14 during pivotal movement. As illustrated in FIG. 2, the counterweight 36 does not interfere with the rotation of the brush 14.

Figure 3:
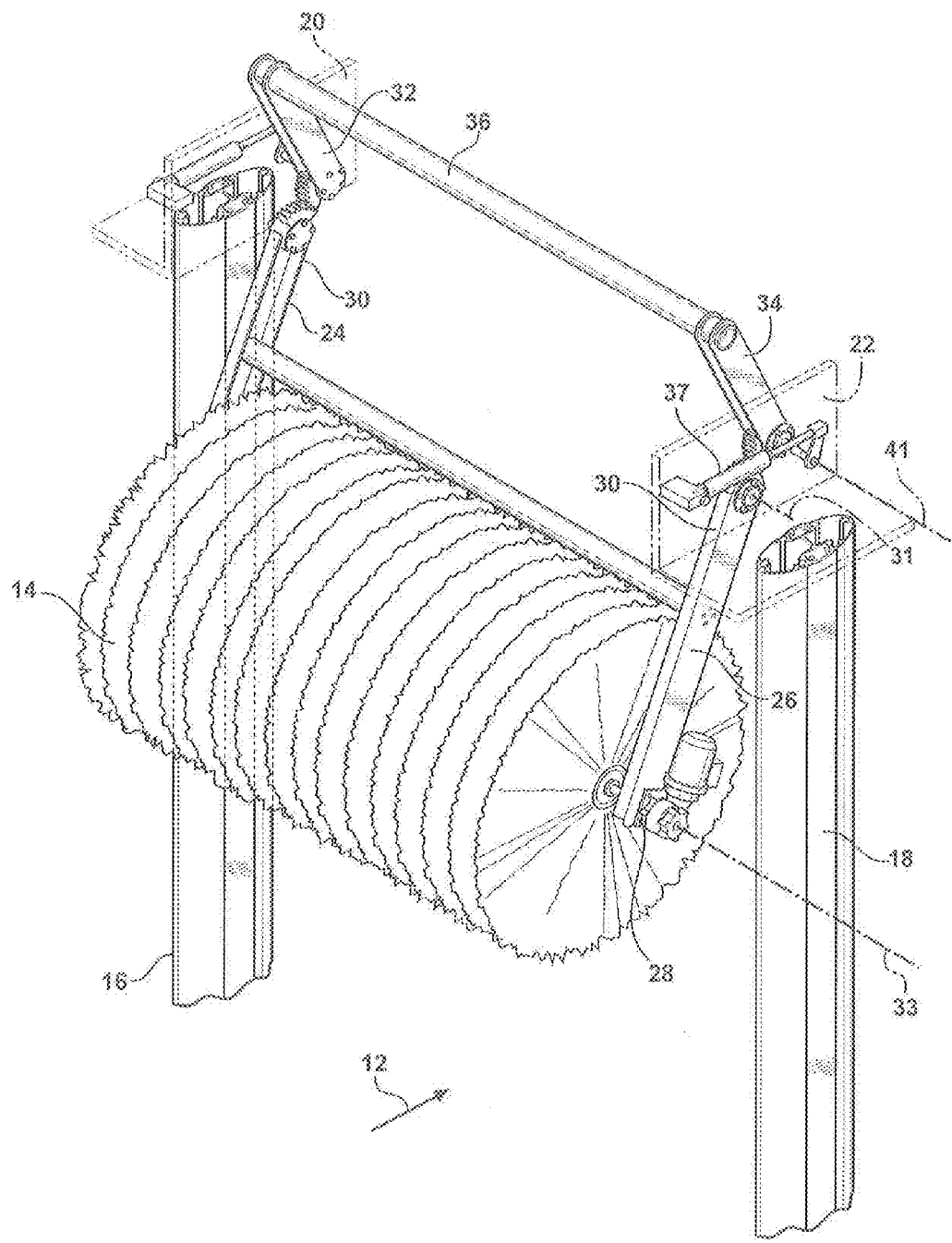
FIG. 3 is a perspective view of the apparatus of FIG. 1 with the top brush is in a fully lowered position and the counterweight is in a fully raised position.
Figure 4:
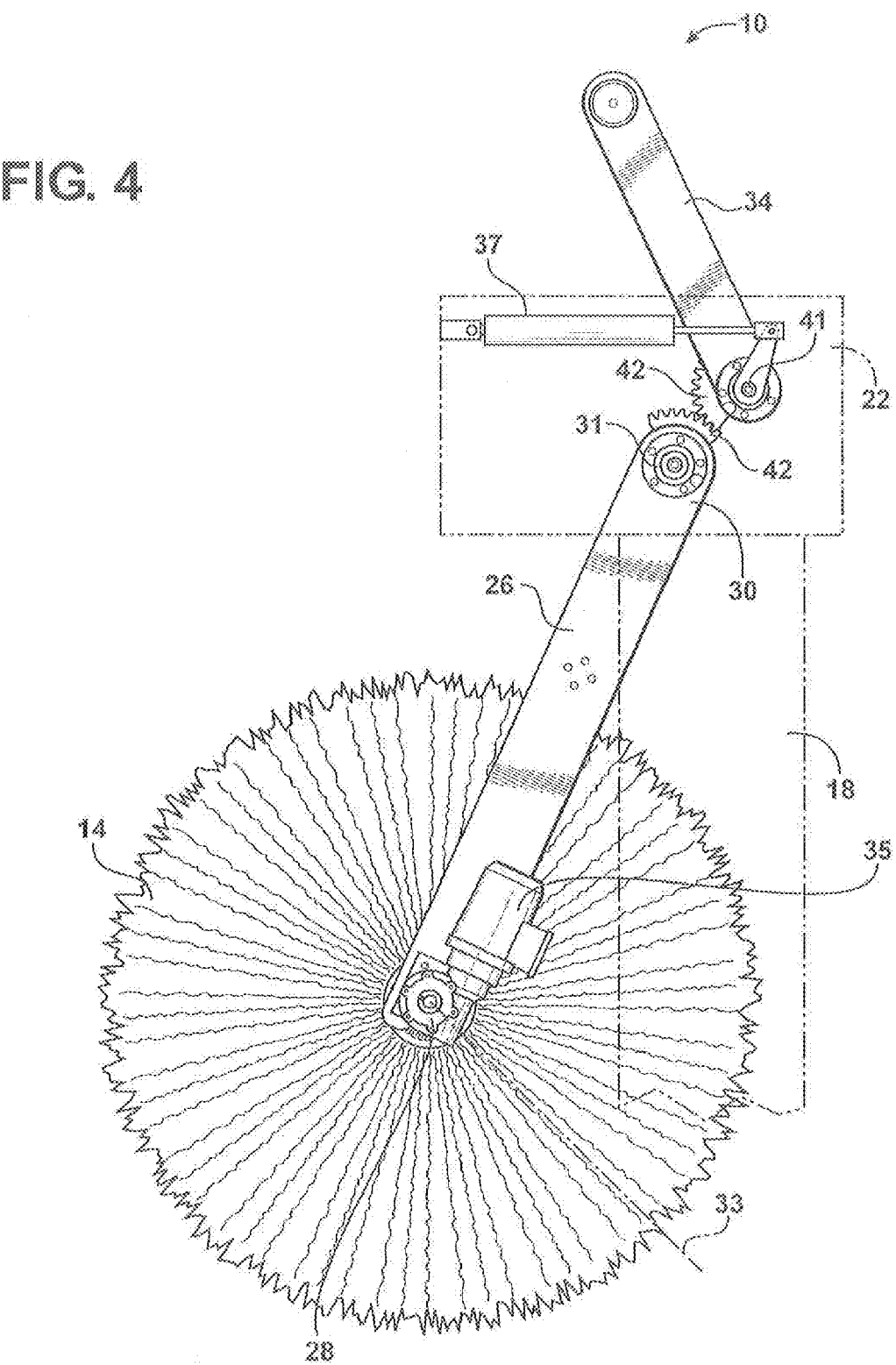
FIG. 4 is a side view of the apparatus of FIG. 1 in with the top brush is in a fully lowered position and the counterweight is in a fully raised position.

In FIGS. 3-4, the brush arms 24, 26 are moved in the downward direction and the counterweight 36 is raised synchronously in the opposite direction. The angle between the brush support arms 24, 26 and the counterweight support arms 32, 34 increases as the brush 14 is moved downward, but does not equal or exceed 180 degrees. The counterweight 36 is a steel tube and can be filled with various materials to bring it to the desired weight. A net brush downforce of about 15 pounds is desired.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A counterweight pivotal support system for a horizontal carwash implement comprising:
    a first pair of support arms having free ends and adapted to be pivotally mounted in parallel, spaced apart relationship;
    a carwash implement mounted between the free ends of the first pair of support arms;
    a second pair of support arms separate from the first pair of support arms, having free ends and adapted to be pivotally mounted in parallel, spaced apart relationship proximate the first arms;
    a counterweight mounted commonly to and extending between the free ends of the second pair of arms; and
    means for mechanically interconnecting the first and second pair of arms for causing the arms to synchronously pivot in opposite directions whereby the counterweight reduces the effective weight in the implement.

2. The system of claim 1 wherein the implement is a brush.

3. A counterweight system for a car wash brush having a horizontal axis of rotation comprising:
    a pair of spaced apart, parallel brush support arms having free ends and being mounted for pivotal movement about a first axis;
    a brush mounted for rotation between the free ends of the brush support arms to define a swept volume;
    a pair of spaced apart, parallel counterweight support arms having free ends and being mounted in adjacent relationship with the brush support arms for pivotal movement about a second axis;
    a counterweight connected commonly to and extending between the free ends of the counterweight support arms, the counterweight passing inside the swept volume when the brush support and counterweight support arms are substantially parallel; and
    a mechanical linkage interconnecting the brush support arms and the counterweight support arms to cause the arms to move synchronously and in opposite directions.

4. The counterweight system as defined in claim 3 wherein the mechanical linkage includes first and second gears connected to pivot with the respective brush support and counterweight support aims and enmeshed with one another.

5. A counterweighted pivotal arm system for a rotating vehicle brush extending across a wash lane comprising:
    a pair of vertical supports disposed on opposite sides of the wash lane;
    brush support pivotally mounted to the vertical supports and defining a first pivot axis, the brush being rotatable about an axis of rotation which is parallel to the first pivot axis;
    a counterweight extending across the wash lane;
    counterweight support means pivotally mounted to the vertical supports defining a second pivot axis which is parallel to the first pivot axis, and further having free ends;
    the counterweight being mounted commonly to and extending between the free ends of the counterweight support means;
    means for interconnecting the brush support means and the counterweight support means so that they pivot in opposite directions relative to one another.

6. The counterweighted pivotal arm system of claim 5 wherein the brush support means further comprises first and second spaced apart, parallel arms located at opposing ends of the brush.

7. The counterweighted pivotal arm system of claim 6 wherein the counterweight support means further comprises a pair of spaced apart, parallel arms interconnected between by opposing ends of the counterweight.

8. The counterweighted support means of claim 5 wherein the counterweight support means further comprises:
- a pair of spaced apart, parallel arms interconnected between by opposing ends of the counterweight, the counterweight support arms having a length less than the length of the brush support arms for passage of the counterweight inside a swept volume of the brush during pivotal movement.

9. A car wash brush assembly comprising:
- a pair of supports proximate and on opposite sides of a wash lane;
- a pair of brush support arms pivotally connected to respective supports for synchronous parallel rotation about a first pivot axis;
- a rotary brush mounted to and extending between the free ends of said brush support arms;
- a pair of counterweight support arms pivotally connected to supports for synchronous parallel rotation about a second pivot axis in adjacent but spaced parallel relation to said first pivot axis;
- any elongate counterweight mounted to and extending between the free ends of said counterweight support arms adjacent but clear of the swept volume of said rotary brush; and
- means for mechanically interconnecting the brush support arms with the counterweight support arms to cause the arms to swing in opposite directions from one another when in operation.

* * * * *